(12) United States Patent
Carsten et al.

(10) Patent No.: US 8,054,628 B2
(45) Date of Patent: Nov. 8, 2011

(54) METHOD FOR OPERATING A SEALED FOR LIFE COMPACT SECONDARY SUBSTATION

(75) Inventors: Thrue Carsten, Horsens (DK); Bartosz Kopczynski, Warsaw (PL); Mariusz Wilniewczyc, Warsaw (PL)

(73) Assignee: ABB Technology AG, Zürich (CH)

( * ) Notice: Subject to any disclaimer, the term of this patent is extended or adjusted under 35 U.S.C. 154(b) by 304 days.

(21) Appl. No.: 12/076,344

(22) Filed: Mar. 17, 2008

(65) Prior Publication Data
US 2008/0288122 A1 Nov. 20, 2008

(30) Foreign Application Priority Data

Mar. 16, 2007 (EP) ..................................... 07104347

(51) Int. Cl.
H05K 7/20 (2006.01)
H02B 1/00 (2006.01)
(52) U.S. Cl. ........ 361/698; 361/679; 361/688; 361/602; 361/603
(58) Field of Classification Search .......................... None
See application file for complete search history.

(56) References Cited

U.S. PATENT DOCUMENTS

| | | | | |
|---|---|---|---|---|
| 3,359,551 A * | 12/1967 | Dennison | ................. | 340/310.16 |
| 4,249,170 A * | 2/1981 | Cham et al. | .................... | 340/646 |
| 4,321,421 A * | 3/1982 | Pierce | .......................... | 174/11 R |
| 4,901,182 A * | 2/1990 | Book | .............................. | 361/38 |
| 5,661,280 A * | 8/1997 | Kuss et al. | ....................... | 218/43 |
| 5,689,097 A * | 11/1997 | Aufermann et al. | .......... | 218/157 |
| 5,721,659 A * | 2/1998 | Young | ............................ | 361/111 |
| 6,362,444 B1 * | 3/2002 | Lee | ................................... | 218/3 |
| 7,451,012 B2 * | 11/2008 | Wang et al. | ................... | 700/162 |
| 7,558,033 B2 * | 7/2009 | Zhou et al. | ....................... | 361/42 |
| 7,567,160 B2 * | 7/2009 | Folts et al. | ....................... | 336/55 |

FOREIGN PATENT DOCUMENTS

| | | |
|---|---|---|
| DE | 2401531 A1 | 7/1975 |
| DE | 19924431 A1 | 11/2000 |
| FR | 2571777 A1 | 4/1986 |
| FR | 2699016 A1 * | 6/1994 |
| GB | 2349993 * | 11/2000 |

OTHER PUBLICATIONS

European Search Report—Sep. 20, 2007.

* cited by examiner

*Primary Examiner* — Boris Chervinsky
(74) *Attorney, Agent, or Firm* — Venable LLP; Eric J. Franklin

(57) ABSTRACT

A method for operating a sealed for life compact secondary substation including a transformer, a high voltage side and a ring main unit arranged at the high voltage side and connected to a primary side of a the transformer, a secondary side of the transformer is connected a low voltage switch gear. An enclosure includes watertight material capable of withstanding corrosion at least for a life time of the compact secondary substation. The compact secondary substation is cooled with a cooling system that includes a heat exchanger. The compact secondary substation is protected with an extended arc eliminator. The compact secondary sub-station is connected to a remote control for surveillance and operation, which remote control is communicating with a fault protection equipment.

11 Claims, 2 Drawing Sheets

METHOD FOR OPERATING A SEALED FOR LIFE COMPACT SECONDARY SUBSTATION

CROSS-REFERENCE TO RELATED APPLICATIONS

This application claims priority to European patent application 07104347.5 filed Mar. 16, 2007.

FIELD OF THE INVENTION

The present invention relates to a method for operating a sealed for life Compact Secondary Substation (CSS) and a sealed for life CSS, which CSS at the high voltage side comprise a Ring Main Unit (RMU) connected to the primary side of a transformer, which transformer at the secondary side is connected a low voltage switch gear.

BACKGROUND OF THE INVENTION

CSS' are installed either surface mounted or underground. Underground CSS' are exposed to an unfriendly environment due to dust and moisture which may impact on the functionality and life time of the electrical equipment. Air ducts are needed for cooling purposes. The ducts end above ground and disturb the appearance in the surrounding environment where the CSS is installed in public accessible areas. Underground CSS' are often arc fault protected using an arc killer inside the SF6 gas insulated RMU (ring main unit), which might be combined with an arc guard system. The arc killer senses a sudden increase of pressure caused by an internal electric arc inside the tank and reacts by grounding the internal bus bars and an explosion is prevented. The reaction on the pressure increase takes more than 20 ms from arc, i.e. one cycle at 50 Hz inhibits that damage to the ring main unit usually occurs, i.e. extended repair is necessary, which is even more complicated and costly in underground conditions with narrow access, stairs, general tightness etc. Regular inspection and maintenance is necessary. Special adaptations or designs to blend the air ducts into the environment might be necessary. After an arc fault, manual repair and reinstallation work is necessary.

OBJECT OF THE INVENTION

It is the object of the invention to avoid any service or maintenance to a CSS during the normal period for life of a CSS.

SUMMARY OF THE INVENTION

This object can be achieved with a CSS as described herein if the CSS enclosure is made of watertight material, which material can withstand corrosion at least for its life time, which CSS can be cooled by a cooling system, which cooling system comprises at least one heat exchanger, which CSS can be protected by an extended arc eliminator, which CSS can be connected to a remote control for surveillance and operation, which remote control communicates with a fault protection equipment.

The expression "extended arc eliminator" means that the arc eliminator is immediately grounding at least the high voltage side of the transformer probably by grounding the ring main unit. This grounding takes place as fast as 20 milliseconds after indication of a arc. The main grounding contact will relatively fast hereafter take over and the arc eliminator can be released approximately after operation in only 70 milliseconds.

To achieve a life time of approximately 20 years, the CSS has to be build in a way to overcome environmental treatment and also wear out by normal operation for the internal components.

The CSS has to be built in an enclosure which is completely sealed in such way that penetration of dust and humidity is completely avoided. In order to overcome the environmental action on the housing for the CSS, the sealing for life for CSS' will preferably withstand temporary three meters high of flooding without any leakage. Therefore, the new CSS could be built as above ground types or partly buried type or underground types.

Inside the transformer substation enclosure, maintenance free equipment is placed. A cooling system is applied in all situations and in order to avoid ventilation grids the CSS comprises a cooling system operating in conjunction with a heat exchanger. This heat exchanger could be a liquid to liquid heat exchanger or it could be an air to air heat exchanger. For the extremely long life time, the liquid to liquid heat exchanger is preferred.

The heat exchanger and the cooling system in the CSS can operate with a cooling system that comprises a compressor. In order to control the hermetic substation, a remote control system communicates with the CSS. Sealing of the CSS enclosure is ensured by using water tight concrete, plastic or metal. All cable openings are equipped with water tight cable entries 23a and 23b made of ethylene propylene diene monomer rubber (EPDM rubber) or flexible material with similar properties. If using concrete material the enclosure of the CSS should preferably be covered by a flexible sealing, for example a slurry type superflex D1. This sealing protects the water tight concrete from chemical aggression of underground water. Furthermore, the sealed concrete CSS can be covered with a thin layer of foamed polystyrene or similar material which is used to reduce mechanical impact of the soil on the sealing.

A Distribution Automation (DA) system can be connected to almost every part of the equipment, which DA system can be provided with software functions for automatic control of most of the components in the CSS. The DA system can be connected to a high number of different sensors placed in the CSS. The software can monitor these sensors differently depending on the function of the sensors. Some sensors, e.g. arc sensors have to be continuously supervised by the DA system. Other sensors such as temperature and pressure in different positions of the CSS need only to be controlled with some time intervals. The DA system might control the cooling system and as such adjust the cooling system into a way of operation which is optimal depending on the actual situation in the CSS.

The DA system can be connected to a central control room, which central control room can have access to the status of the CSS, which CSS is remotely controlled from the control room. During normal operation, the DA system can deliver status of all sensors to the control room periodically. From the control room, it is possible to survey and operate the CSS automatically or manually.

The enclosure of the CSS can be completely sealed and the equipment inside the enclosure can be maintenance free for 20 years of lifetime. By hermetic shielding, it is avoided that any dust or humidity gets access to the inner of the CSS.

Sealing of the CSS enclosure can be ensured by producing it from watertight concrete. In this way water is prevented from penetrating the docking station of the CSS.

All cable openings in the CSS can be equipped with a watertight cable entry made from EPDM rubber. Hereby is achieved that humidity is prevented from getting access to the CSS along the cables. In order to avoid humidity from the inner of the cables, it is possible to keep the pressure inside the CSS higher than the pressure outside the CSS.

DETAILED DESCRIPTION OF THE INVENTION

Figure 1:
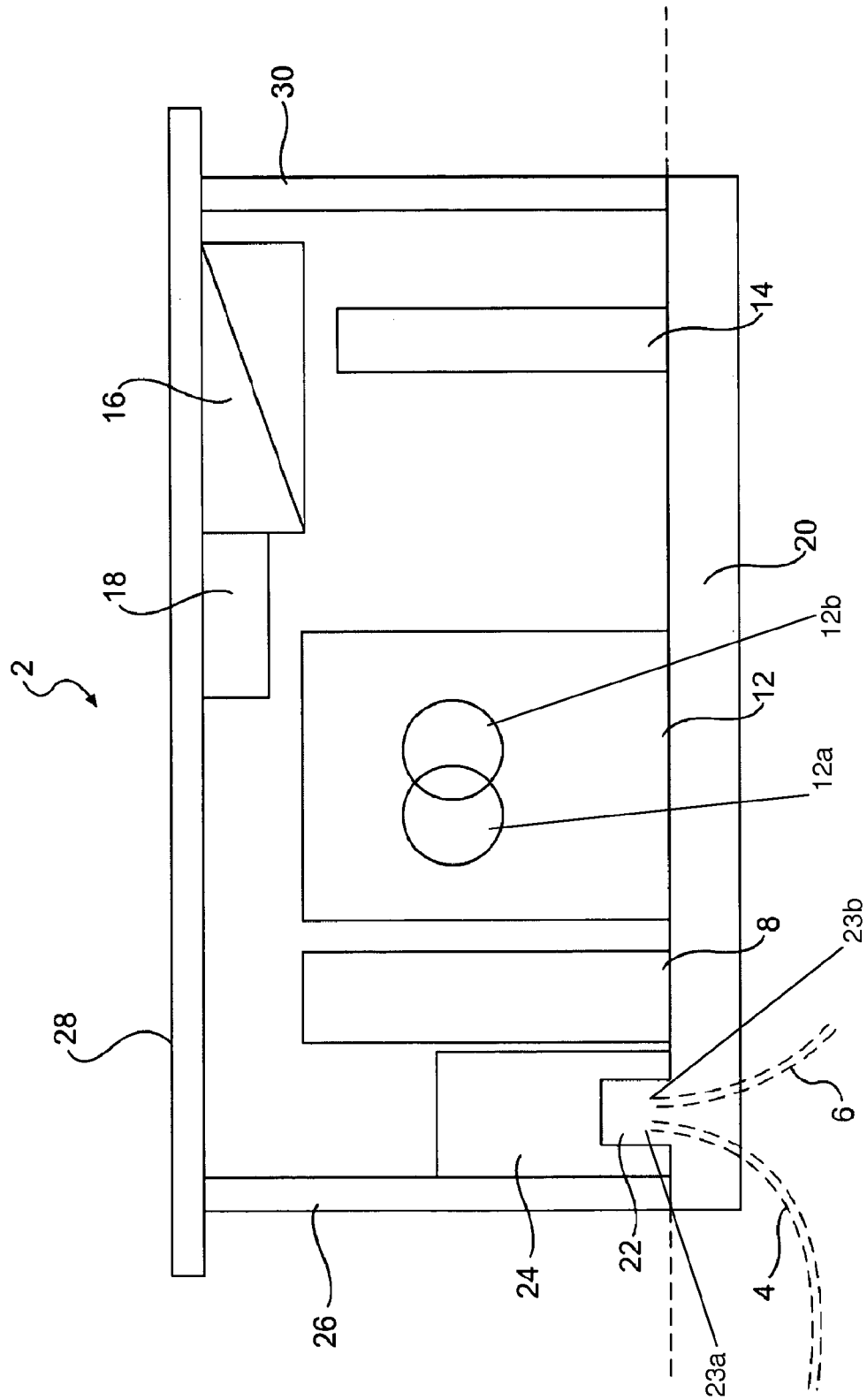
FIG. 1 shows a sectional view of a CSS 2.

FIG. 1 shows a sectional view of a CSS 2. This CSS 2 is connected to high voltage power lines 4 and 6 for forming a ring connection of the CSS 2. The CSS 2 comprises a ring main unit 8 from where a high voltage power connection delivers high voltage to the transformer 12. The transformer includes primary 12a and secondary 12b sides. This transformer delivers low voltage to a low voltage switch gear 14. The CSS further comprises a heat exchanger 16 and the CSS also comprises a control unit 18. The CSS is placed on a docking station 20 which docking station has high voltage and low voltage contact arrangements 22 placed at the docking station and cooperating with a contact arrangement 24 placed in the CSS. The CSS includes watertight cable entries 23a and 23b. The housing for the CSS has side walls 26 and 30 and a roof 28.

The CSS as shown on FIG. 1 can be hermetic sealed and with the combination of the effective cooling by the heat exchanger 16 and the control unit 18 it is possible to achieve a life time of the CSS without any service that exceed 20 years of operation.

Figure 2:
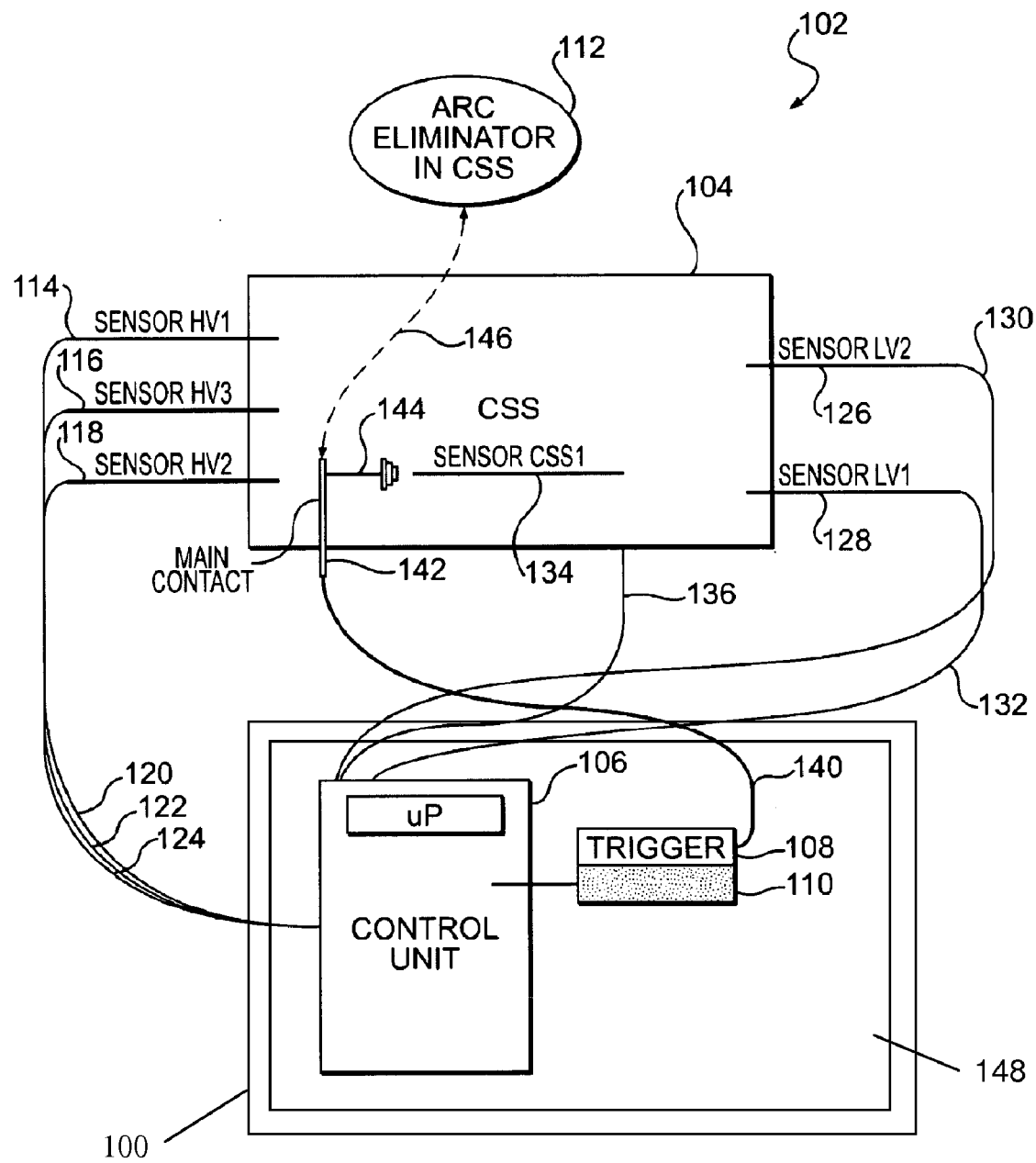
FIG. 2 shows an embodiment for a CSS system.

FIG. 2 shows an embodiment for a CSS system 102 according to the invention. The inner of a CSS 104 which comprises a control unit 106 which is connected to a trigger unit 108 and which control unit cooperates with an UPS-circuit 110. An arc eliminator 112 in the CSS is shown. High voltage arc sensors 114, 116, 118 are connected by lines 120-124 to the control unit 106. Low voltage sensors 126 and 128 are connected to lines 130 and 132 to the control unit. Furthermore, a sensor 134 is also indicated in the CSS, which sensor over line 136 communicates with the control unit 106. The trigger unit 108 is over lines 140 connected to a main contact 142 and further over line 146 to the arc eliminator 112. The CSS is remotely controlled from a central control room 100.

In normal operation, the transformer in the CSS will have a high voltage input and a low voltage out output. The different sensors 114, 116 and 118 at the high voltage side and the sensors 126 and 128 are monitoring all arc critical positions in the CSS. The number of sensors can be much higher than the one here indicated. If one of the sensors 114, 116, 118 or 126 and 128 indicates a fault e.g. detecting a beginning arc, a signal is immediately transmitted over lines 120, 122, 124 or 130, 132 to the control unit 106. This control unit will activate the trigger 108 which over line 140 transmits a signal to the main contact 142 which main contact starts to switch into a grounding position, but the signal continues over line 146 to the arc eliminator 112 which immediately are grounding at least the high voltage side of the transformer probably by grounding the ring main unit. This grounding takes place as fast as 20 milliseconds after the first arc is indicated. The main contact will relatively fast hereafter take over and the arc eliminator 112 can be released approximately after operation in only 70 milliseconds.

The control unit 106 which is connected to the UPS-supply 110 continues operation and the control unit 106 might send out an alarm signal in order to start a procedure where at first a manual control of the control unit is performed from a control room in order to check if there is a critical failure or maybe the control unit could be ordered into normal operation again by means of a remote control 148 in giving a command to the main contact 142. Probably, after arc detection there will be some damage somewhere in the CSS 102 such that maintenance is necessary before a new activation. This very fast arc eliminator will reduce damage in the CSS 102 and the fast reaction will probably avoid direct explosion in the CSS 102.

The invention claimed is:

1. A method for operating a sealed for life compact secondary substation comprising a transformer comprising a primary side and a secondary side, a high voltage side comprising a ring main unit and operatively connected to the primary side of the transformer, low voltage switch gear operatively connected to the secondary side of the transformer, a cooling system comprising a heat exchanger, a main contact, and an extended arc eliminator operatively connected to the main contact of the compact secondary substation, the compact secondary substation further comprising an enclosure comprising watertight material capable of withstanding corrosion at least for a life time of the compact secondary substation, the method comprising:
    enclosing the transformer, the low voltage switchgear, cooling system, main contact, extended arc eliminator, and high voltage side within the enclosure,
    cooling the compact secondary substation with the cooling system,
    protecting the compact secondary substation with the extended arc eliminator, and
    connecting the compact secondary substation to a remote control for surveillance and operation, which remote control is communicating with a fault protection equipment.

2. The method for operating a sealed for life compact secondary substation according to claim 1, wherein a distribution automation system is connected to substantially every part of the compact secondary substation, wherein the distribution automation system comprises software functions configured to automatically control substantially all components in the compact secondary substation.

3. The method for operating a sealed for life compact secondary substation according to claim 2, wherein the distribution automation system is connected to a central control room having access to a status of the compact secondary substation, wherein the compact secondary substation is remotely controlled from the control room.

4. The method for operating a sealed for life compact secondary substation according to claim 1, wherein the enclosure is completely sealed and equipment inside the enclosure is maintenance free.

5. The method for operating a sealed for life compact secondary substation according to claim 3, wherein the enclosure comprises watertight concrete.

6. The method for operating a sealed for life compact secondary substation according to claim 1, wherein all cable openings in the compact secondary substation comprise a watertight cable entry made from EPDM rubber.

7. A sealed for life compact secondary substation, comprising:
    a transformer comprising a primary side and a secondary side;

a high voltage side comprising a ring main unit operatively connected to the primary side of the transformer;

low voltage switch gear operatively connected to the secondary side of the transformer;

a cooling system comprising a heat exchanger;

a main contact, an extended arc eliminator operatively connected to the main contact, an enclosure comprising watertight material, wherein the material can withstand corrosion at least for a life time of the compact secondary substation, wherein the transformer, the low voltage switchgear, cooling system, main contact, extended arc eliminator and high voltage side are arranged within the enclosure, a control unit remote from the enclosure and operatively connected to the enclosure for surveillance and operation; and a fault protection equipment operatively connected to the remote control.

8. The sealed for life compact secondary substation according to claim 7, further comprising:

a distribution automation system connected to substantially every part of the compact secondary substation, the distribution automation system comprising software functions configured to automatically control substantially every part of the compact secondary substation.

9. The sealed for life compact secondary substation according to claim 8, wherein the distribution automation system is connected to a central control room, which central control room has access to the status of the compact secondary substation, which compact secondary substation is remotely controlled from the control room.

10. The sealed for life compact secondary substation according to claim 7, wherein the enclosure is completely sealed and equipment inside the enclosure is maintenance free.

11. The sealed for life compact secondary substation according to claim 7, wherein all cable openings in the compact secondary substation are equipped with watertight cable entry made from EPDM rubber.

* * * * *